United States Patent

Leonard

[15] 3,688,600

[45] Sept. 5, 1972

[54] INFINITELY VARIABLE OVERDRIVE TRANSMISSION MECHANISM

[72] Inventor: Allan S. Leonard, Livonia, Mich.

[73] Assignee: Ford Motor Company, Dearborn, Mich.

[22] Filed: April 26, 1971

[21] Appl. No.: 137,375

[52] U.S. Cl. .................................. 74/690, 74/688
[51] Int. Cl. ............................................. F16h 37/06
[58] Field of Search .............................. 74/690, 691

[56] References Cited

UNITED STATES PATENTS

| | | | |
|---|---|---|---|
| 2,164,504 | 7/1939 | Dodge | 74/690 |
| 2,716,357 | 8/1955 | Rennerfelt | 74/691 |
| 3,203,278 | 8/1965 | General | 74/691 X |
| 3,204,476 | 9/1965 | Rouverol | 74/690 X |
| 3,238,816 | 3/1966 | Schottler | 74/690 |
| 3,494,224 | 2/1970 | Fellows et al. | 74/691 |
| 3,545,302 | 12/1970 | Schofield | 74/691 |
| 3,620,101 | 11/1971 | Abbott et al. | 74/691 |

*Primary Examiner*—Carlton R. Croyle
*Assistant Examiner*—Thomas C. Perry
*Attorney*—John R. Faulkner and Donald J. Harrington

[57] ABSTRACT

A planetary gear mechanism having multiple ratios, at least one of which is an underdrive ratio, including an overdrive unit acting in cooperation with the gearing to provide an overdrive range wherein the overdrive unit is located at the power input side of the gearing where it is adapted to provide a torque delivery path between the torque input elements of the gearing and the power input portions of the mechanism with an infinitely variable speed ratio, the overall speed ratio of the gear system during operation in one limiting ratio in the overdrive range being close to the direct drive ratio of unity.

4 Claims, 5 Drawing Figures

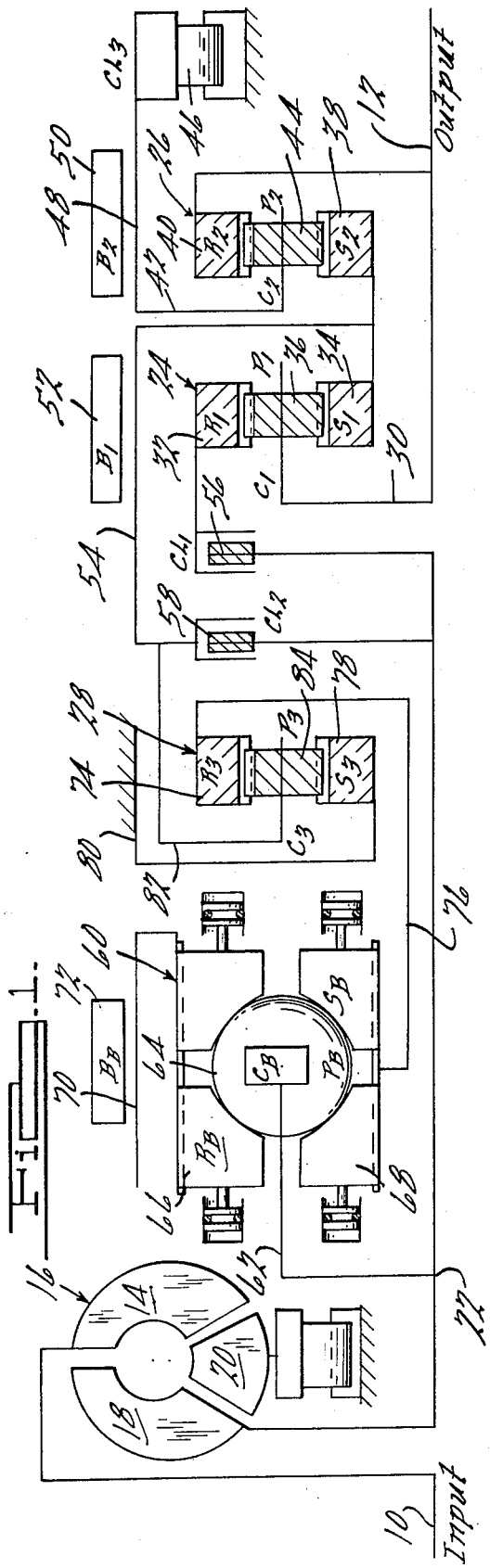

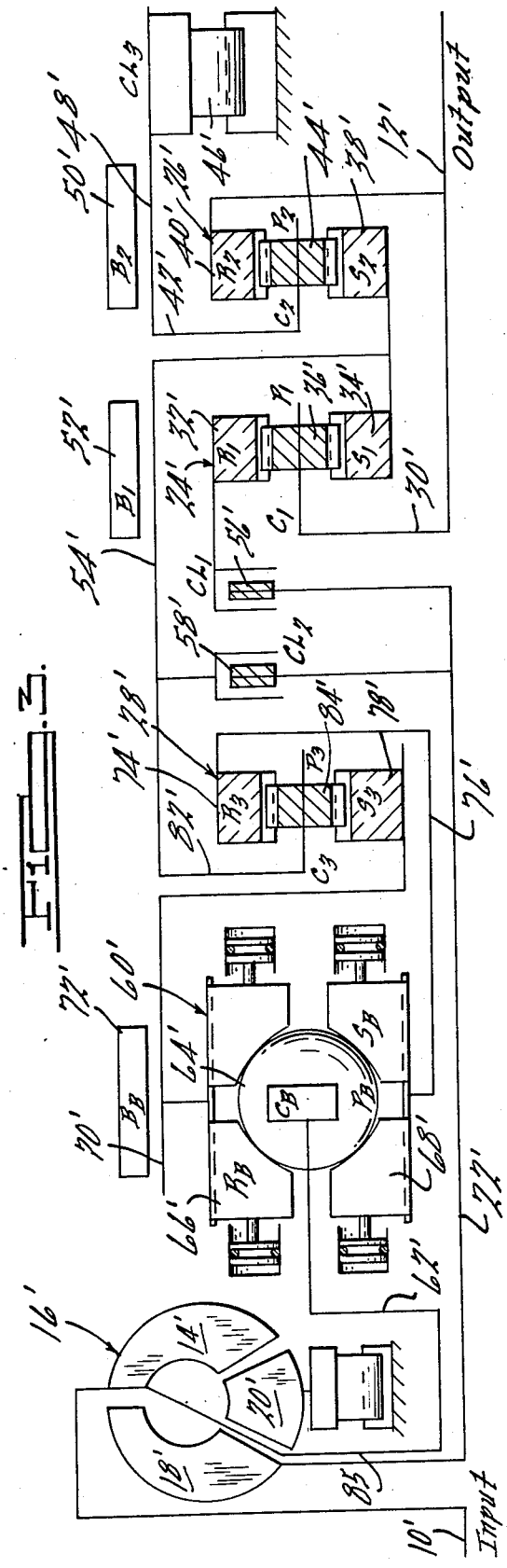

INFINITELY VARIABLE OVERDRIVE TRANSMISSION MECHANISM

GENERAL DESCRIPTION OF THE INVENTION

This invention relates to the disclosure of co-pending application Ser. No. 137,374, filed Apr. 26, 1971. That co-pending disclosure, as well as this disclosure, deals with overdrive power transmission mechanisms wherein an infinitely variable overdrive unit acts in cooperation with the planetary gear elements of a planetary gear system, the latter acting to provide at least one underdrive ratio, a reverse ratio and a direct drive ratio while the overdrive unit is inactive. If an upshift from the direct drive ratio to the overdrive range is desired, a reaction brake for the overdrive unit may be applied so that its elements may cooperate with gear elements to provide an overdrive speed ratio range wherein the overdrive ratio may be infinitely varied between two operating limits, the lowermost limit providing an overall ratio equal to or only slightly greater than the direct drive ratio of unity. In the particular embodiment disclosed here, the overdrive unit is a ball friction unit situated between the gearing and a hydrokinetic torque converter at the power input end of the transmission. When it is so situated, it is subjected to a lower torque level than the torque level to which it would be subjected if it were located at the torque output end of the transmission mechanism.

The transmission mechanism of my invention is adapted especially for use in an automotive vehicle having an internal combustion engine. The overdrive ratio is available during cruising operation under steady-state operating conditions. The infinitely variable overdrive ratio characteristic prevents frequent hunting between the direct drive ratio of the gearing and the overdrive ratio as the road load changes with the vehicle operating in the overdrive range. If a change in road load should be experienced with the transmission in the overdrive range, the ratio characteristics of the overdrive unit will vary to accommodate the changes in road load. The overdrive unit is used in conjunction with an auxiliary planetary gear to reduce the torque capacity requirements on the infinitely variable overdrive unit. Since the torque level for the overdrive unit is reduced, the reliability of the unit as well as the infinitely variable ratio controls is improved.

BRIEF DESCRIPTION OF THE FIGURES OF THE DRAWINGS

FIG. 1 shows in schematic form the torque delivery elements of one embodiment of my invention;

FIG. 2 is a chart showing the speeds of the torque delivery elements of the gear system of FIG. 1 relative to the speed of the input shaft;

FIG. 3 is a modified form of my invention which differs from the embodiment of FIG. 1 by the dual split torque delivery path between the torque converter and the input side of the overdrive unit;

FIG. 4 is a chart showing the speeds of rotation of the torque delivery elements of the gear system of FIG. 3 relative to the speed of the input shaft;

PARTICULAR DESCRIPTION OF THE INVENTION

Figure 5:
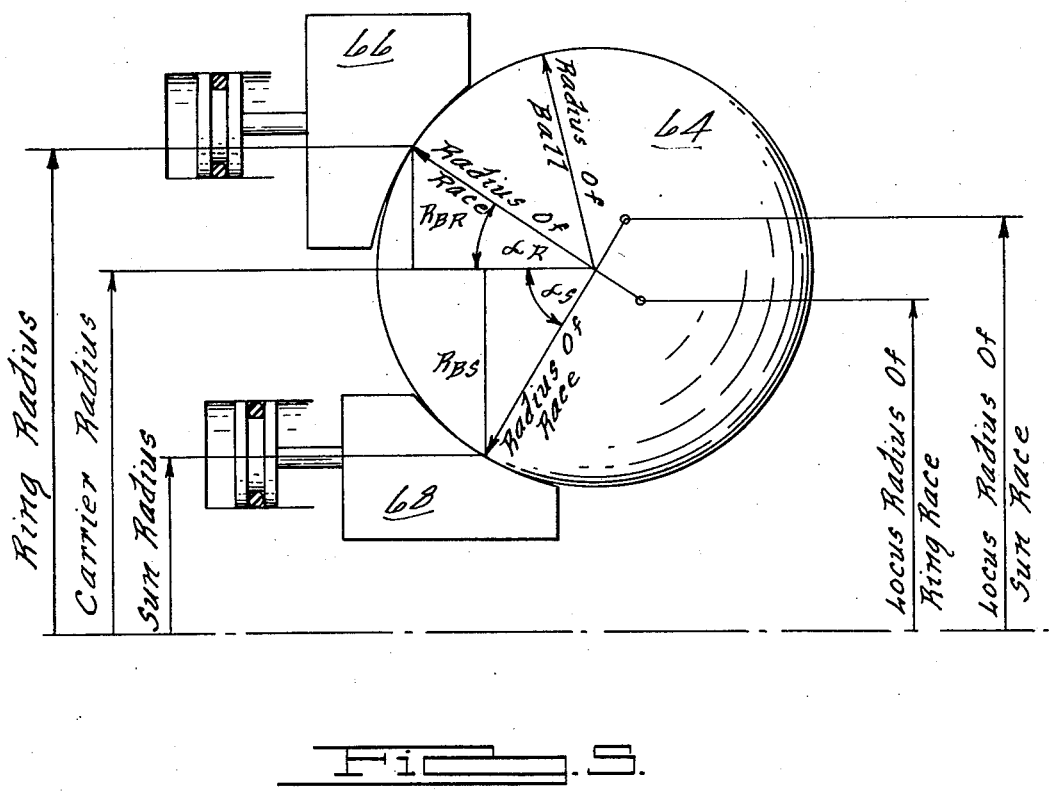
FIG. 5 is a diagram showing the geometry of the friction overdrive unit used in the embodiments of FIGS. 1 and 3.

Numeral 10 designates the end of a crank shaft of an internal combustion engine. Numeral 12 designates the power output shaft of the transmission mechanism. It may be connected drivably to the vehicle traction wheels through a suitable drive shaft and differential-and-axle assembly.

Shaft 10 is connected to a bladed impeller 14 of a hydrokinetic torque converter unit 16. Unit 16 includes also a bladed turbine 18 and a bladed stator 20. The impeller, the turbine and the stator are located in toroidal fluid flow relationship in the usual fashion.

Turbine 18 is connected drivably to turbine shaft 22, which serves as a torque input shaft for the gearing.

The gearing includes two simple planetary gear units 24 and 26 and an auxiliary gear unit 28, the latter forming a part of the overdrive mechanism. Gear unit 24 includes a carrier 30, which is connected directly to the power output shaft 12. Gear unit 24 includes also ring gear 32, sun gear 34 and planet pinions 36 journalled on carrier 30 so that they mesh with gears 32 and 34.

Gear unit 26 includes sun gear 38, which is connected to or formed integrally with sun gear 34. Gear unit 26 includes also a ring gear 40, which is connected to power output shaft 12. Carrier 42 of gear unit 26 journals pinions 44 which mesh with gears 38 and 40. Carrier 42 is braked against the transmission housing through an overrunning brake 46 so that it may act as a reaction member during low speed ratio, forward-drive operation. Carrier 42 is connected to brake drum 48 about which is positioned brake band 50. During low speed ratio, hill-braking operation, brake band 50 is applied. It is applied also during operation in reverse.

Intermediate speed ratio operation is accomplished by engaging brake band 52 which surrounds brake drum 54. Sun gears 34 and 38 are connected drivably to brake drum 54.

Turbine shaft 22 is connected drivably to the ring gear 32 through forward drive clutch 56. This clutch is engaged during operation in each forward drive ratio. Shaft 22 is connected drivably to the sun gears through selectively engageable clutch 58 which is applied during operation in high speed ratio and during reverse drive operation.

The overdrive unit is designated by reference character 60. It includes a carrier 62 which is connected directly to the turbine shaft 22. The series of balls 64 are supported by the carrier 62. The balls 64 may rotate about their axes, and the carrier 62 is adapted to accommodate changes in radial position of the balls with respect to the shaft 22.

The balls 64 frictionally engage a pair of outer races 66 which contact the balls 64. The contact between the balls 64 and races 66 is point contact along the rolling circle. Similarly, balls 64 engage inner races 68 along the rolling circle. The surfaces of the races that engage the balls are concave and have a radius of curvature greater than the radius of the balls. As the races 66 are moved axially with respect to each other and as races 68 are moved axially in unison with the axial adjustment of races 66, the effective rolling radius of the balls is changed.

Outer races 66 are connected to brake drum 70 about which is positioned a reaction brake band 72.

Brake band 72 can be applied to anchor races 66, thereby overspeeding the inner races 68 as carrier 62 acts as a torque input member. Races 68 in turn are connected to ring gear 74 of gear unit 28, the connection being provided by a sleeve shaft 76. Sun gear 78 of gear unit 28 is anchored to the transmission housing as shown at 80. Carrier 82 of gear unit 28 carries pinions 84 which engage ring gear 74 and sun gear 78. Carrier 82 is connected directly to brake drum 54.

During operation of the transmission in the overdrive range, clutch 58 is released and turbine torque from shaft 22 is distributed through engaged clutch 56 to the ring gear 32. A portion of the turbine torque is distributed to carrier 62. Brake band 72 is applied during overdrive operation, thereby causing ring gear 74 to be overdriven by the races 68. This imparts a forward driving motion to the sun gear 34, the angular velocity of gear 34 being greater than engine speed. This provides an overall torque ratio less than unity.

It is possible for the infinitely variable unit to operate with a speed ratio that will result in an effective overall ratio very close to unity at the minimum overdrive end of the overdrive operating range. This is apparent from inspecting the relative speeds in the second column of the chart of FIG. 2. The overall speed ratio can be changed, however, by varying the infinitely variable ratio of the overdrive unit so that the effective relative speed of the driven member is about 1.8 times the speed of the shaft 22. The torque distributed through the infinitely variable unit is of a reduced magnitude because it is situated ahead of the torque transmitting gearing and because it is adapted to receive only a part of the input torque, the remaining part of the input torque being distributed directly through the clutch 56 to the input ring gear 32.

FIG. 5 shows schematically the geometric configuration of the balls and the races. The balls adapt and engage races at a point of contact having an angular disposition with respect to a horizontal reference line as shown by angle $\alpha r$. If the angle $\alpha_r$, upon axial adjustment of the races, equals approximately 65°, the overdrive ratio will be very close to unity. On the other hand, if the races are adjusted so that the angle $\alpha_r$ equals approximately 24°, the output shaft speed during overdrive operation will equal about 1.8 times the speed of the shaft 22.

FIG. 3 shows an alternate embodiment of the invention. It differs from the concept of FIG. 1 insofar as the torque flow path to the infinitely variable unit is concerned. Each of the elements of FIG. 5 that has a counterpart in the structure of FIG. 1 has been designated by similar characters, although prime notations have been added.

In the FIG. 3 embodiment the sun gear 78' is anchored by the brake band 72'. During overdrive operation the same brake band 72' anchors the outer races 66' of the overdrive unit 60'. The torque converter 16' of the mechanism of FIG. 3 has an impeller which is connected directly to the carrier 62' of the overdrive unit 60'. This connection is established through a driving member 85, which includes drive struts extending through the torus circuit of the converter. Driving member 85 establishes a direct connection between the impeller and carrier 62' so that impeller torque is distributed to the input side of overdrive unit 60'. Turbine torque on the other hand is distributed directly from turbine 18' through turbine shaft 22'. During overdrive operation the turbine torque is distributed then through engaged clutch 56' to the ring gear 32'. Thus a split torque delivery path is established although the portion of the torque being distributed through the overdrive gear unit is distributed through a mechanical torque delivery path rather than through the hydrokinetic unit.

The chart of FIG. 4 is similar to the chart of FIG. 2. It indicates the speeds of the torque delivery elements of FIG. 3 relative to the speed of the engine. Two values for relative speeds are represented in FIG. 4 for the overdrive range. The first value represents the lowest overdrive ratio available in the overdrive range and the second value represents those speeds when the overdrive unit is operating at its upper limit.

Having thus described two embodiments of my invention, what I claim and desire to secure by U.S. Letters Patent is:

1. A multiple ratio power transmission mechanism having an infinitely variable overdrive capability comprising planetary gear elements; a driven shaft connected to a power output gear element; brake means for anchoring a second gear element to provide torque reaction during underdrive ratio operation; first clutch means for connecting a power input shaft to a power input gear element; an overdrive unit comprising a reaction member, a torque output member and a torque input member; means for distributing a portion of the torque of said power input shaft to the torque input member of said overdrive unit; an auxiliary gear unit comprising a ring gear, a sun gear and a planet carrier; means for anchoring the sun gear of said auxiliary gear unit during overdrive operation; a torque output element of said overdrive unit being connected to the ring gear of said auxiliary unit; the carrier of said auxiliary unit being connected to a second power input gear element during overdrive operation thereby increasing the overall speed ratio, and means for varying the torque ratio of said overdrive unit between a first operating value which results in an overall speed ratio close to unity and a second operating value which results in overall speed ratios substantially greater than unity.

2. The combination as set forth in claim 1 wherein said overdrive unit comprises a ball friction drive having a series of torque transmitting balls; a carrier registering with said balls; said carrier being adapted to function as said torque input member for said overdrive unit; adjustable outer races frictionally contacting said balls at locations spaced radially inwardly from the points of contact between said balls and said outer races; and brake means for anchoring the outer races during overdrive operation whereby the inner races are overdriven, said inner races being connected directly to the ring gear of said auxiliary unit.

3. The combination as set forth in claim 1 wherein the torque input member of said overdrive unit is connected directly to said power input shaft; the driving connection between said power input shaft and said power input gear element including a hydrokinetic turbine situated in parallel disposition with respect to the driving connection between said power input shaft and the carrier of said overdrive unit whereby parallel input torque delivery paths are provided; one of which is a hydrokinetic path and the other of which is a solid mechanical path.

4. The combination as set forth in claim 2 wherein the torque input member of said overdrive unit is connected directly to said power input shaft, the driving connection between said power input shaft and said power input gear element including a hydrokinetic turbine situated in parallel disposition with respect to the driving connection between said power input shaft and the carrier of said overdrive unit whereby parallel input torque delivery paths are provided; one of which is a hydrokinetic path and the other of which is a solid mechanical path.

* * * * *